US006805319B2

(12) United States Patent
Senepart

(10) Patent No.: US 6,805,319 B2
(45) Date of Patent: Oct. 19, 2004

(54) VARIABLE-LIFT DIRIGEABLE BALLOON

(75) Inventor: Marc Senepart, Laloubere (FR)

(73) Assignee: Aerospace Adour Technology, Pau (FR)

( * ) Notice: Subject to any disclaimer, the term of this patent is extended or adjusted under 35 U.S.C. 154(b) by 72 days.

(21) Appl. No.: 10/149,038

(22) PCT Filed: Dec. 7, 2000

(86) PCT No.: PCT/FR00/03431

§ 371 (c)(1),
(2), (4) Date: Jun. 7, 2002

(87) PCT Pub. No.: WO01/42082

PCT Pub. Date: Jun. 14, 2001

(65) Prior Publication Data

US 2002/0179771 A1 Dec. 5, 2002

(30) Foreign Application Priority Data

Dec. 9, 1999 (FR) .............................. 99 15641

(51) Int. Cl.⁷ ................................. B64B 1/58
(52) U.S. Cl. ......................... 244/96; 244/128
(58) Field of Search .................. 244/30, 31, 96, 244/97, 125, 128

(56) References Cited

U.S. PATENT DOCUMENTS

| 1,729,925 A | | 10/1929 | Bradford | |
| 1,797,502 A | | 3/1931 | Hall | |
| 2,078,532 A | * | 4/1937 | Fischer | 244/95 |
| 2,180,036 A | | 11/1939 | Dardel | |
| 3,096,047 A | * | 7/1963 | Dunn, Jr. | 244/97 |
| 3,446,457 A | * | 5/1969 | Struble, Jr. | 244/97 |
| 4,261,534 A | * | 4/1981 | Roselli | 244/96 |
| 4,850,551 A | * | 7/1989 | Krawetz et al. | 244/97 |
| 5,090,637 A | * | 2/1992 | Haunschild | 244/97 |
| 5,368,067 A | * | 11/1994 | Cook, Jr. | 244/96 |

FOREIGN PATENT DOCUMENTS

| FR | 2 320 229 A | 3/1977 |
| GB | 237 346 A | 7/1925 |
| GB | 1 348 408 A | 3/1974 |

* cited by examiner

Primary Examiner—Galen L. Barefoot
(74) Attorney, Agent, or Firm—Weingarten, Schurgin, Gagnebin & Lebovici LLP

(57) ABSTRACT

The invention seeks to provide a dirigible balloon with an internal enclosure (V2) having a flexible wall (4) contained in an outer rigid enclosure (15) which is of aerodynamic shape. The internal enclosure (V2) contains helium and is provided with means (5, 6, 7, 8) enabling its volume to be modified. Thus, depending on the volume given to the internal enclosure (V2) of the dirigible balloon, landing, take-off, and altitude variation are easy to perform. The means for modifying the volume of the internal enclosure (V2) comprise a cable (8) connected to the internal enclosure (V2) by means of a set of pulleys (5, 6), and a winch (7) for reducing the length of the cable (8).

17 Claims, 2 Drawing Sheets

VARIABLE-LIFT DIRIGEABLE BALLOON

The present invention proposes providing a dirigible balloon with a flexible-walled enclosure containing helium that supports the balloon, together with means for modifying the volume of the flexible enclosure.

The present invention can be applied to any type of variable-lift device making use of an enclosure containing helium. Helium can be replaced by any other gas that is lighter than air, such as methane, ethane, hydrogen, or neon, for example.

Volume variation must take place without friction against the rigid outer enclosure of the dirigible which defines its aerodynamic shape, while nevertheless enabling lift to be varied and enabling varying forces to be transmitted depending on the flight altitude required of the apparatus. Landing, take-off, and varying altitude are then all performed very easily using the novel device described in the present invention.

When the flexible-walled enclosure is fully deployed, its shape is substantially cylindrical. When the means enabling the volume of the enclosure to be modified are operated, the flexible wall can take on a folded shape that lies within its initial substantially cylindrical shape.

The present invention is defined in general terms by a variable-lift device comprising a structure an internal enclosure containing a lighter than air gas, e.g. helium, carrying said structure. The device is characterized by the fact that the internal enclosure has a flexible wall and in that the device has means for modifying the volume of the internal enclosure.

The means for modifying the volume of the internal enclosure may comprise at least one cable connecting the flexible wall to at least one winch. Said cable may be connected to the flexible wall by means of at least one pulley. Said pulley may be fixed to at least one beam fixed on the flexible wall.

In a particular embodiment of the invention, the internal enclosure is provided near its bottom with a set of pulleys and near its top with two beams provided with another set of pulleys so as to co-operate with said cable to constitute block-and-tackle.

In a particular embodiment of the invention, the means for modifying the volume of the internal enclosure may be located inside the internal enclosure.

The structure of the device of the invention may include a ballast tank comprising at least one supply of helium communicating with the internal enclosure via at least one valve and at least one compressor. The ballast tank may comprise two symmetrical tanks.

The structure of the device of the invention may comprise an external enclosure containing the internal enclosure. The volume between the internal enclosure and the external enclosure may communicate with the outside of the dirigible balloon through at least one orifice provided with at least one heat exchanger. A heat exchanger may use as its heat source the exhaust gases from an engine. A heat exchanger may use as its heat sink the water that results from condensation phenomena.

The device of the invention may be used in a dirigible balloon for hoisting or transporting loads.

Other advantages and characteristics of the invention appear better on reading an embodiment of the invention illustrated by the accompanying drawings, in which.

Figure 1:
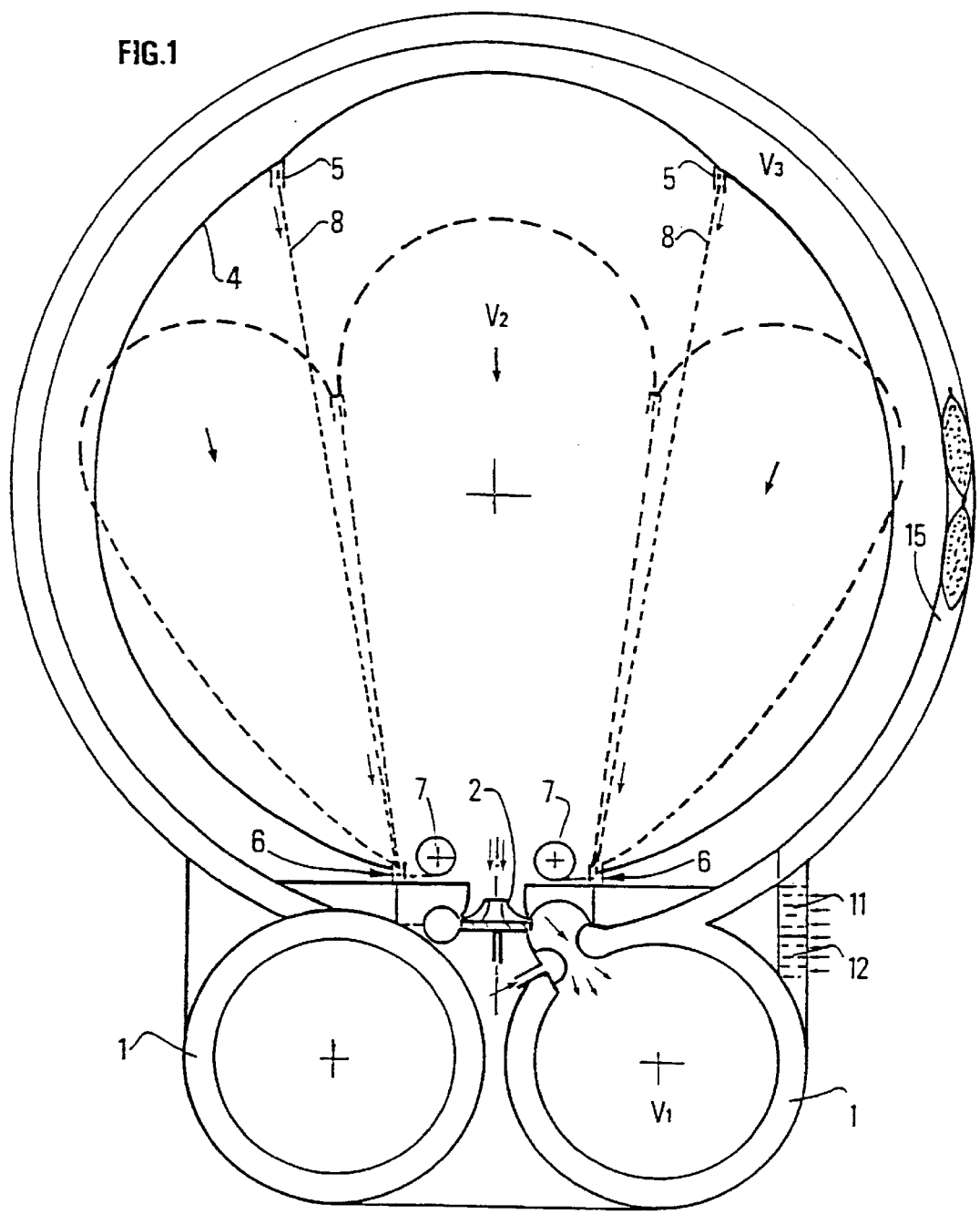
FIG. 1 is a cross-section view through a dirigible balloon.
Figure 2:
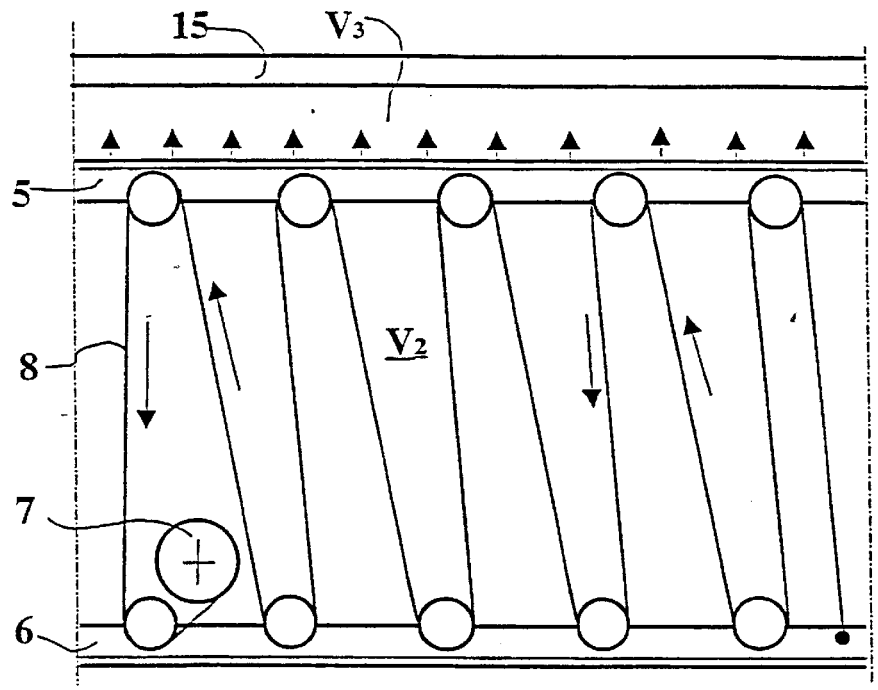
FIG. 2 shows means enabling the shape of the flexible enclosure to be modified.

The device constituting an embodiment of the invention as shown in FIG. 1 comprises three portions. The first portion is constituted by a ballast tank (1) of rigid shape made of reinforced composite material and constitutes a tank of volume (V1) in which helium gas is compressed by means of a compressor (2). The second portion constitutes an external enclosure (4) having a flexible wall that is in communication with the tank, and in which helium gas can expand. A valve interposed between the internal enclosure (4) and the tank controls helium admission. The internal enclosure (4) is of heart-shaped section when deployed. Each of the two edges of the heart shape is symmetrically connected to a respective beam (5) carrying a series of pulleys (FIG. 2). At the bottom of the internal enclosure (4) there is disposed a beam (6) on a first portion of the device, and a cable (8) is threaded between the beams (5 and 6). One of the ends of the cable is connected to a winch (7) enabling the length of the cable to be reduced by acting on the block-and-tackle formed in this way so as to pull down the top portion of the internal enclosure (4), curving its shape inwards. Simultaneously, the helium compressor (2) is put into operation to return the gas from the enclosure (4) into the ballast tank (1). As the volume (V2) of the internal enclosure (4) decreases, so is the lift to the dirigible balloon decreases. Under opposite circumstances, gas is released into the internal enclosure (4) by opening the valve (3) and the cable is allowed to run off the winch in proportion to the expansion of the gas. The pressure inside the internal enclosure (4) remains constant and the load constituted by the dirigible is transmitted continuously to the flexible wall by the two beams (5 and 6).

The third portion of the device is an external enclosure (15) constituting the outer shell of the rigid structure of the dirigible balloon. The external enclosure (15) is multi-lobed, and the lobes as constituted in this way are compressed by helium under regulated pressure. This disposition ensures constant pressure within the lobes constituting the external enclosure (15) and stiffness the structure while simultaneously providing good insulation for the air contained in the compensation volume (V3) lying between the internal enclosure (4) and the external enclosure (15), which volume varies when the dirigible is maneuvering. This disposition considerably reduces the temperature differences with the outside environment during a flight and contributes to adiabatic operation (in compression and expansion) for the helium gas within the internal enclosure (4).

In particular embodiments:

The wall of the internal enclosure (4) of heart-shaped section can be reinforced externally by a net which transmits forces, the wall serving on its own to provide gastightness and optionally being made up of a plurality of layers of cloth each having respective specific characteristics, low helium permeability, thermal insulation, resistance to folding and tearing.

The assembly can have a plurality of compartments operating on the same principle but distributed longitudinally inside the rigid shell of the dirigible.

The internal enclosure (4) can be connected to two symmetrical ballast tanks (1), where this configuration has the advantage of distributing forces better on equilibrium, and of reducing the volume of the ballast tanks while stiffening the load-carrying structure as a whole.

The compressors can be situated between the ballast tanks or inside them in a variant that is not shown, without the basic principles being altered.

In the assembly shown in FIG. 2, the winch (7) is included inside the internal enclosure (4) so as to avoid any need for the cable to pass through the skin via a sealing gland which is always difficult to implement. Nevertheless other dispositions are possible for adapting the principle to the structure of the apparatus.

In the present description (FIG. 1), the valves interposed in the stream of helium between the ballast tanks and the internal enclosure (4) are implemented by constricting the duct under pressure between the deformable portion and the rigid duct which feeds the ballast tank. Any other valve structure could be used without modifying the basic principle thus disclosed.

The space between the two ballast tanks is used for containing turbines that drive the multistage compressors for the helium and the compensation air inside the volume (V3) that is left empty between the variable enclosure and the inside volume of the rigid shell. Gas exchange takes place in compliance with the diagram given in FIG. 3. Equilibrium between the portions of the device of the invention is obtained by very close regulation of the volumes (V1, V2, and V3) in terms of pressure and temperature, depending on conditions of flight. When the outside air cools with increasing altitude, the equilibrium air of the compensating volume (V3) is heated in a heat exchanger using the exhaust gases of the propulsion engines of the dirigible as a heat source. This operation takes place through openings in the structure of the dirigible.

Figure 3:
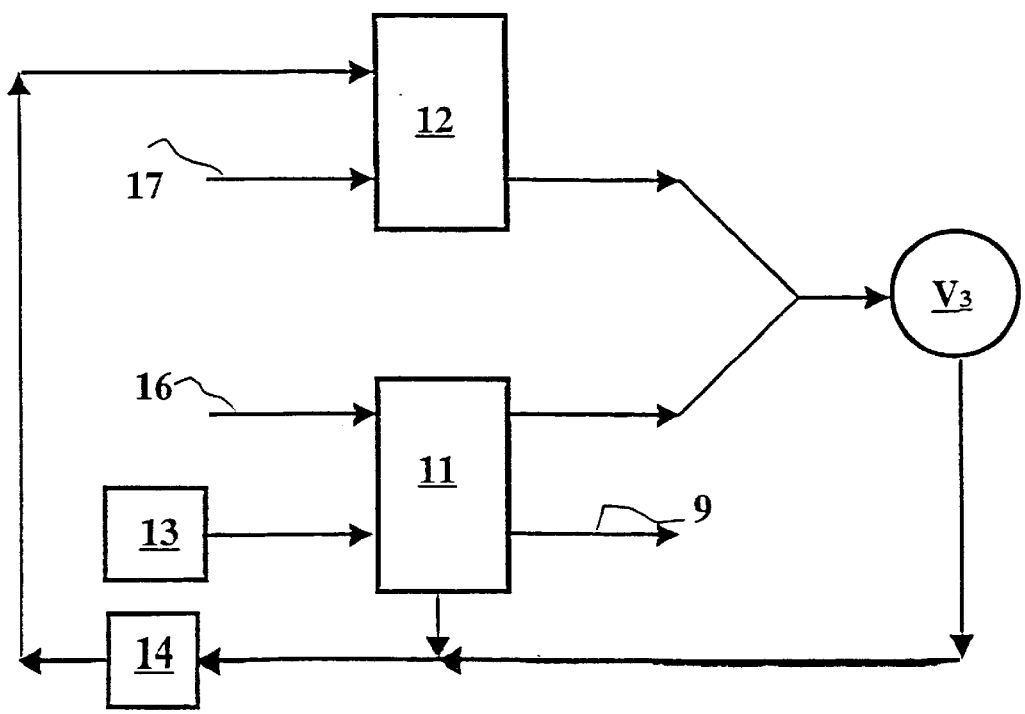
FIG. 3 is a block diagram showing how gas is exchanged within the dirigible balloon.

One description of gas exchanges is given in FIG. 3, although the principle is not limited to this particular description. If the outside air temperature drops well below the reference temperature inside the enclosure (V3), the air (16) that is admitted is heated by the heat exchanger (11) which has the exhaust gases produced by the engine (13) passing therethrough. This operation ends up by causing the water that results from the combustion of the exhaust gases to condense, and this water is recovered and stored in a tank (14). Residual gases ($CO_2$) are exhausted (9) to the outside. The water that results from condensation from the air inside the volume (V3) is also collected and stored in the tank (14).

This operation produces several advantages:

The compensation air is heated and heat exchange conditions are complied with in the polytropic transformation of the volume (V2) of the internal enclosure (4). The temperature of the helium gas varies little.

Recovering the condensation water balances, to some extent, the loss of weight due to fuel being consumed. The weight balance of the apparatus is conserved better throughout a flight.

The ambient noise from the engines is reduced since exhaust gases are exhausted via the heat exchangers.

The apparatus has practically no temperature signature: which constitutes a significant advantage in military applications.

If the outside temperature increases, the air (17) that is admitted is directed via a second heat exchanger (12) which operates as an evaporator on the basis of the water stored in the tank (14). The air cooled in this way inside the structure contributes to maintaining ideal exhaust conditions for the polytropic transformation characterizing the change in the volume (V2) of the internal enclosure (4) containing helium, and of the volume (V3).

The device of the invention is particularly intended for improving the performance of dirigibles designed on this principle and for deforming helium enclosures so as to be able to vary the lift of the apparatus dynamically under all flight conditions.

What is claimed is:

1. A variable-lift device comprising:

a structure; and an internal enclosure having a flexible wall and containing a gas that is lighter than air carrying said structure, the internal enclosure being provided near its bottom with a first plurality of beams, each one of the first plurality of beams being provided with a first set of pulleys, and near its top with a second plurality of beams, each one of the second plurality of beams being provided with a second set of pulleys, so as to co-operate with a cable connected to a winch to constitute a block-and-tackle.

2. The device according to claim 1, characterized in that said structure includes a ballast tank comprising at least one helium tank communicating with the internal enclosure via at least one valve and at least one compressor.

3. The device according to claim 7, characterized in that the ballast tank comprises two symmetrical tanks.

4. The device according to claim 1, characterized in that it comprises an external enclosure containing the internal enclosure, and in that a volume between the internal enclosure and the external enclosure communicates with the outside of the external enclosure via at least one orifice fitted with at least one heat exchanger.

5. The device according to claim 4, characterized in that said heat exchanger uses as a heat source exhaust gases of an engine.

6. The device according to claim 4, characterized in that said heat exchanger uses as a heat sink water that results from condensation phenomena.

7. The device according to claim 1 wherein the device is used in a dirigible balloon for hoisting or transporting loads.

8. The device according to claim 1, wherein the first and second sets of pulleys and the cable are disposed inside the internal enclosure.

9. The device according to claim 1, wherein the first and second sets of pulleys, the cable, and the first and second pluralities of beams are disposed inside the internal enclosure.

10. The device according to claim 1, wherein the block-and-tackle is disposed inside the internal enclosure.

11. The device according to claim 10, characterized in that said heat exchanger uses as a heat sink water that results from condensation phenomena.

12. The device according to claim 1, characterized in that:

said structure includes a ballast tank comprising at least one helium tank communicating with the internal enclosure via at least one valve and at least one compressor;

the ballast tank comprises two symmetrical tanks;

it comprises an external enclosure containing the internal enclosure, and in that the volume between the internal enclosure and the external enclosure communicates with the outside of the external enclosure via at least one orifice fitted with at least one heat exchanger;

said heat exchanger uses as a heat source exhaust gases of an engine.

13. The device according to claim 12, characterized in that said heat exchanger uses as a heat sink water that results from condensation phenomena.

14. The device according to claim 12 wherein the device is used in a dirigible balloon for hoisting or transporting loads.

15. The device according to claim 13 wherein the device is used in a dirigible balloon for hoisting or transporting loads.

16. A device according to claim 1, characterization in that the internal enclosure is of heart-shaped section when deployed.

17. A device according to claim 1, characterization in that it comprises a plurality of internal enclosures distributed longitudinally inside said structure.

* * * * *